Patented Apr. 22, 1947

2,419,472

UNITED STATES PATENT OFFICE 2,419,472

ELECTRIC INSULATING COMPOSITION

Ludwig E. Thiess, Schenectady, N. Y., assignor to General Electric Company, a corporation of New York No Drawing. Application December 7, 1942, Serial No. 468,123

4 Claims. (Cl. 106—46)

The present invention relates to electric insulators, and particularly to insulators for use in the high frequency field.

It is the object of my invention to provide electric insulators which are characterized by being operable with low energy losses (i. e., low power factor) in high frequency apparatus and circuits, for example in radio apparatus for transmission and reception. Products embodying my invention operate with a low power factor and also possess a high mechanical strength and a dense, non-porous structure.

Heretofore, feldspar has been employed as a vitrification agent in the fabrication of ceramic products from steatite or talc. Such products, when utilized as insulators in the high frequency field, are characterized by high internal energy losses. This characteristic appears to be due to the relatively high alkali content of feldspar.

It has been proposed to utilize in the production of such ceramic products certain lead compounds, such as lead carbonate or lead chloride, but their poisonous character and solubility make it inadvisable to employ them in the manufacture of insulators.

It also has been proposed to utilize a borate of magnesium or manganese as a bonding agent for magnesium silicate or steatite. Such borates were found to introduce difficulties in the manufacture of ceramics. It is convenient to grind and mix ceramic ingredients in ball mills with water. It was found to be impracticable to grind such borates because their substantial water-solubility entailed large loss of such borates when the water was removed by filter-pressing. If these soluble borates were added by other means, such as known as "dry-mixing," where only smaller quantities of water are involved, the borate salts tend to come to the surface as a froth or scum in drying and introduce difficulties in the firing and produce undesirable properties in the finished product. These difficulties are overcome in accordance with my invention.

Insulating compositions made in accordance therewith consist largely of magnesium silicate, such as the minerals steatite or talc, to which is added a relatively small amount of clay and a vitrification-inducing glass or fluxing agent consisting of one or more silicates which are characterized by being substantially devoid of alkali and being fusible at a temperature readily obtainable in pottery kilns, that is, at fusion temperatures of standard pyrometric cones 9 and 10. Expressed otherwise, the compositions may be matured at temperatures of approximately 1250 to 1300° C. Silicates suitable for the purposes of my invention include borosilicates. Included also are calcium magnesium borosilicate, lead silicate and lead-barium silicate.

The following examples are given to illustrate my invention:

A glassy material is prepared by heating a mixture comprising the following ingredients to a temperature of about 1100° C., at which reaction and fusion occur:

| | Parts by weight |
|---|---|
| Boric acid | 46 |
| Calcium carbonate | 32 |
| Magnesium carbonate | 8 |
| Aluminum silicate (clay) | 5 |
| Silica (pottery flint) | 9 |

Many variations in this frit composition are possible within the scope of this invention, especially in the amounts of aluminum-silicate or flint. The calcium and magnesium in the frit may be introduced as the mineral dolomite, which is a natural carbonate of lime and magnesia. In some cases a few per cent of barium carbonate may be added to the composition.

The resulting product, which will be termed a borosilicate frit, is finely ground and then mixed with ground magnesium silicate and preferably also a small amount of clay is included, the range of ingredients being about 75 to 90 per cent talc, about 3 to 20 per cent of borosilicate glass and about 3 to 15 per cent of clay (aluminum silicate). A preferred mixture consists by weight of 75 per cent ground talc, 13 per cent of borosilicate frit and 12 per cent of clay. The mixture is molded into desired form and upon drying is fired in a suitable kiln or oven at a temperature of about 1300° C.

The dielectric constant of the vitrified product is 6.2. The power factor is about 0.10 per cent or lower at 300 kilocycles, which is the specified frequency for testing ceramic material for the radio field under U. S. Navy specifications.

In place of the borosilicate compound of alkaline-earth metals, I may employ as a vitrifying agent lead silicate or a lead-barium silicate. The lead compound may be the lead mono-silicate, consisting of 85 per cent lead oxide and 15 per cent silica, or the lead bi-silicate, composed of approximately 65 per cent lead oxide, 33 per cent silica, and 2 per cent alumina. These lead silicates are insoluble in water and present no difficulties in the manufacture of steatite bodies.

The ceramic bodies made in accordance with my invention have especially favorable characteristics in high frequency fields such as encountered in radio apparatus of the short-wave type. They are completely non-hygroscopic and have a uniform, dense, heat-resistant structure. Power factors as low as 0.05 per cent and dielectric constants of about 5 to 6, both measured at 300 kilocycles, characterize such products. The mechanical strength is very high, being about 20,000 pounds per square inch for flexural strength.

What I claim as new and desire to secure by Letters Patent of the United States is:

1. Electric insulators made by firing at about 1250 to 1300° C. a mixture of about 75 to 90 per cent talc, about 3 to 20 per cent of a glass consisting essentially of calcium-magnesium borosilicate, and about 3 to 15 per cent aluminum silicate, said insulators being characterized by a power factor of less than one-tenth per cent in an electric field of radio frequency, and a flexural strength of approximately 20,000 pounds per square inch.

2. An electric insulator having a uniform, dense structure and consisting of the vitrified product of about 75 per cent talc, about 13 per cent calcium-magnesium-borosilicate glass, and about 12 percent of aluminum silicate, said insulator being characterized by negligibly low electric losses at frequencies of several hundred kilocycles per second.

3. Ceramic bodies consisting by weight of a mixture of about 75 per cent talc, about 12 per cent of aluminum silicate and about 13 per cent of a borosilicate of calcium, magnesium and aluminum, said bodies being adapted to be matured at about 1250 to 1300° C. into non-hygroscopic, dense, heat-resistant and mechanically strong products, which are adapted for use in high frequency electric devices.

4. Electric insulators which are capable of functioning in an electric field of about 300 kilocycles with power factors in the range of about 0.05 to 1.0 per cent and a dielectric constant of about 5 to 6, said insulators consisting by weight of the vitrified product of the following ingredients: about 75 per cent of talc, about 12 per cent of clay and about 13 per cent of a borosilicate glass made by the fusion of a mixture comprising as essential ingredients:

| | Parts by weight |
|---|---|
| Boric acid | 46 |
| Calcium carbonate | 32 |
| Magnesium carbonate | 8 |
| Aluminum silicate | 5 |
| Silica | 9 |

LUDWIG E. THIESS.

REFERENCES CITED

The following references are of record in the file of this patent:

UNITED STATES PATENTS

| Number | Name | Date |
|---|---|---|
| 1,346,874 | Bellamy et al. | July 20, 1920 |
| 2,062,914 | Kuntsmann | Dec. 1, 1936 |
| 2,168,230 | McDowell | Aug. 1, 1939 |